(12) United States Patent
McCcauley

(10) Patent No.: US 11,534,033 B1
(45) Date of Patent: Dec. 27, 2022

(54) COMPRESSION-MOUNTED SHOWER GRAB BAR

(71) Applicant: Thomas McCcauley, Fort Mill, SC (US)

(72) Inventor: Thomas McCcauley, Fort Mill, SC (US)

( * ) Notice: Subject to any disclaimer, the term of this patent is extended or adjusted under 35 U.S.C. 154(b) by 45 days.

(21) Appl. No.: 17/171,033

(22) Filed: Feb. 9, 2021

(51) Int. Cl.
*A47K 3/28* (2006.01)
*F16B 2/00* (2006.01)
*A47K 3/00* (2006.01)

(52) U.S. Cl.
CPC .............. *A47K 3/281* (2013.01); *F16B 2/00* (2013.01); *A47K 3/003* (2013.01)

(58) Field of Classification Search
CPC ............ A47K 3/281; A47K 3/003; F16B 2/00
See application file for complete search history.

(56) References Cited

U.S. PATENT DOCUMENTS

| | | | |
|---|---|---|---|
| 2,637,555 A | 5/1953 | Klaudt | |
| 3,555,576 A * | 1/1971 | Coakley | A47K 3/003 4/577.1 |
| 4,498,204 A * | 2/1985 | Warner | A47K 3/003 4/605 |
| 4,775,056 A | 10/1988 | Inglis | |
| 4,895,471 A | 1/1990 | Geltz | |
| 6,507,960 B1 | 1/2003 | Kelly | |
| 7,877,824 B2 | 2/2011 | Grant | |
| D650,263 S | 12/2011 | Barrese | |
| 2008/0222279 A1 | 9/2008 | Cioffi et al. | |
| 2008/0222790 A1 * | 9/2008 | Grant | A47K 3/003 4/576.1 |
| 2009/0223917 A1 * | 9/2009 | Grant | A47K 3/38 211/105.4 |
| 2012/0285914 A1 * | 11/2012 | Carney | A47H 1/022 211/123 |
| 2013/0117926 A1 * | 5/2013 | Parker | A47H 1/022 4/610 |
| 2021/0196072 A1 * | 7/2021 | Arnold | A47H 1/102 |

FOREIGN PATENT DOCUMENTS

| | | | |
|---|---|---|---|
| CA | 2471965 | 12/2004 | |
| GB | 2238718 | * 6/1991 | ............. A47K 3/003 |

* cited by examiner

*Primary Examiner* — J C Jacyna
(74) *Attorney, Agent, or Firm* — Kyle A. Fletcher, Esq.

(57) ABSTRACT

The compression-mounted shower grab bar incorporates a grab bar, a plurality of mounting plates, a plurality of mounting caps, and a shower. The shower further comprises a first wall and a second wall. The compression-mounted shower grab bar is adapted for use by a client. The compression-mounted shower grab bar forms a structure the client can grasp for improved stability. The compression-mounted shower grab bar mounts between the first wall and the second wall of the shower. The plurality of mounting caps secures the grab bar to the plurality of mounting plates. The grab bar applies a compressive force that presses the plurality of mounting plates against the first wall and the second wall such that the grab bar is: a) secured to a fixed position in the shower; and, b) transfers the load of the client to the first wall and the second wall.

11 Claims, 5 Drawing Sheets

COMPRESSION-MOUNTED SHOWER GRAB BAR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of sanitary equipment including baths, more specifically, a grip for a bath. (A47K3/003)

SUMMARY OF INVENTION

The compression-mounted shower grab bar comprises a grab bar, a plurality of mounting plates, a plurality of mounting caps, and a shower. The shower further comprises a first wall and a second wall. The compression-mounted shower grab bar is adapted for use by a client. The compression-mounted shower grab bar forms a structure the client can grasp for improved stability. The compression-mounted shower grab bar removably mounts between the first wall and the second wall of the shower. The plurality of mounting caps secures the grab bar to the plurality of mounting plates. The grab bar applies a compressive force that presses the plurality of mounting plates against the first wall and the second wall such that the grab bar is: a) secured to a fixed position in the shower; and, b) transfers the load of the client to the first wall and the second wall.

These together with additional objects, features and advantages of the compression-mounted shower grab bar will be readily apparent to those of ordinary skill in the art upon reading the following detailed description of the presently preferred, but nonetheless illustrative, embodiments when taken in conjunction with the accompanying drawings.

In this respect, before explaining the current embodiments of the compression-mounted shower grab bar in detail, it is to be understood that the compression-mounted shower grab bar is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the compression-mounted shower grab bar.

It is therefore important that the claims be regarded as including such equivalent construction insofar as they do not depart from the spirit and scope of the compression-mounted shower grab bar. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
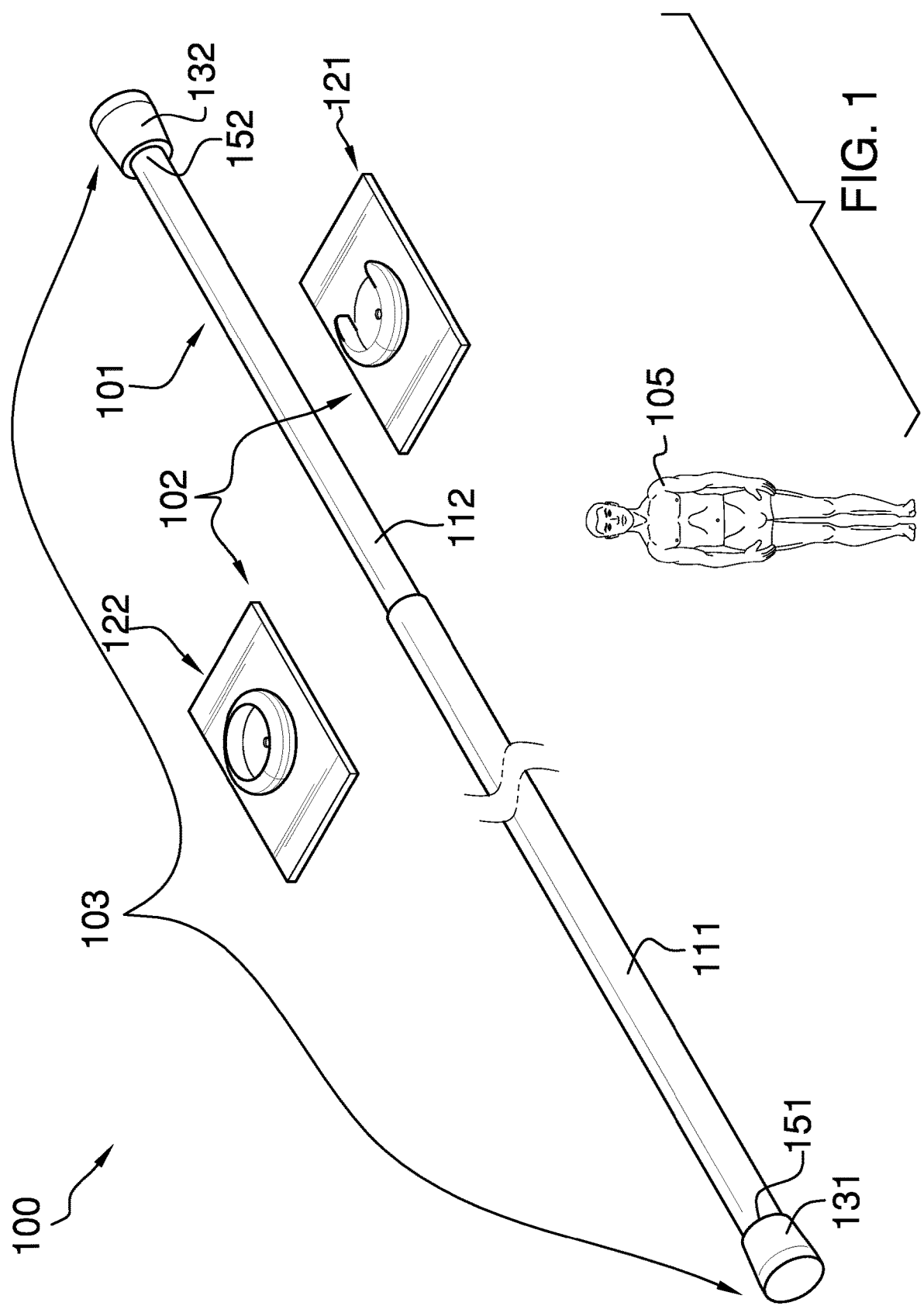
FIG. 1 is a perspective view of an embodiment of the disclosure.
Figure 2:
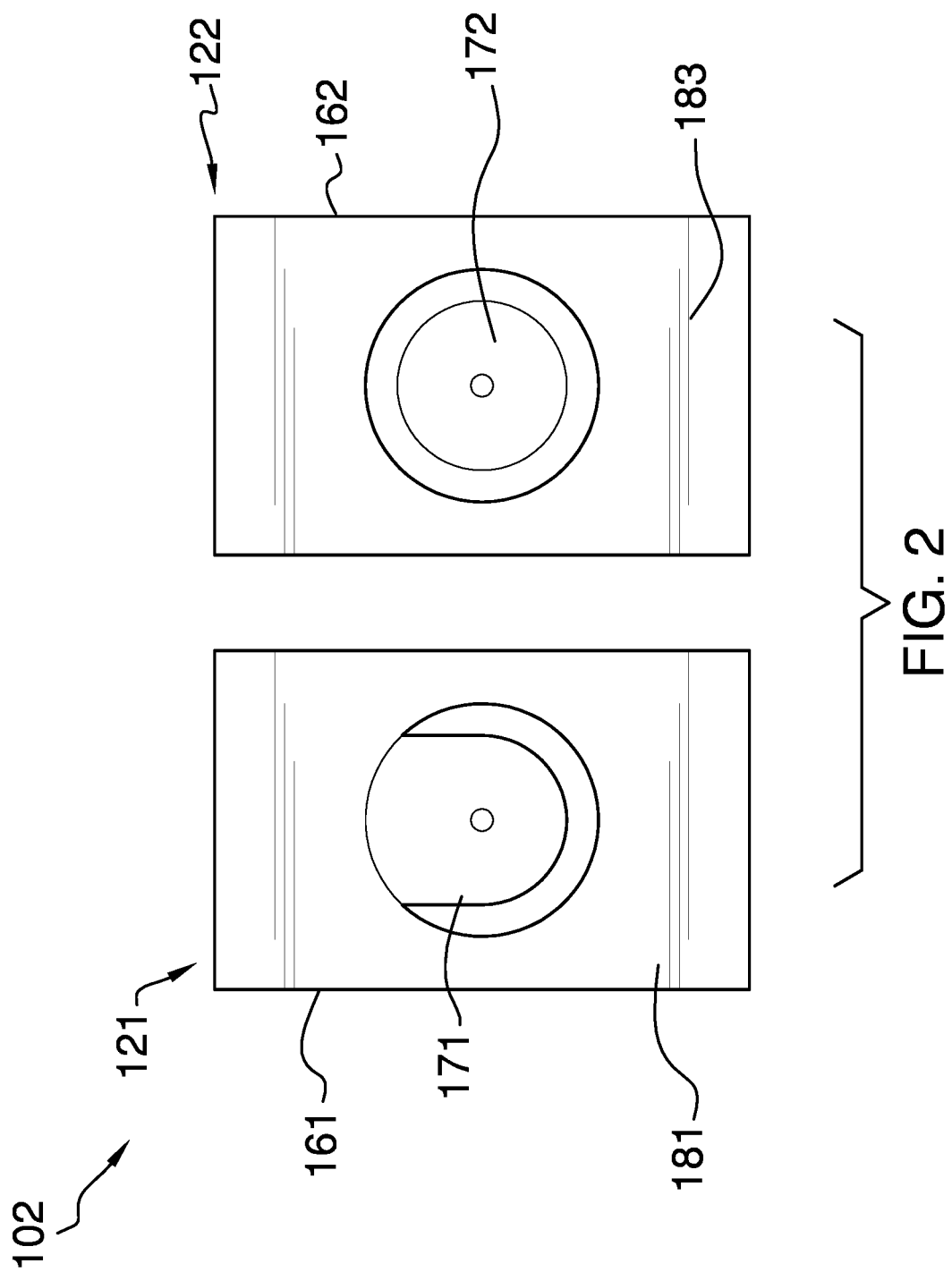
FIG. 2 is a detail view of an embodiment of the disclosure.
Figure 3:
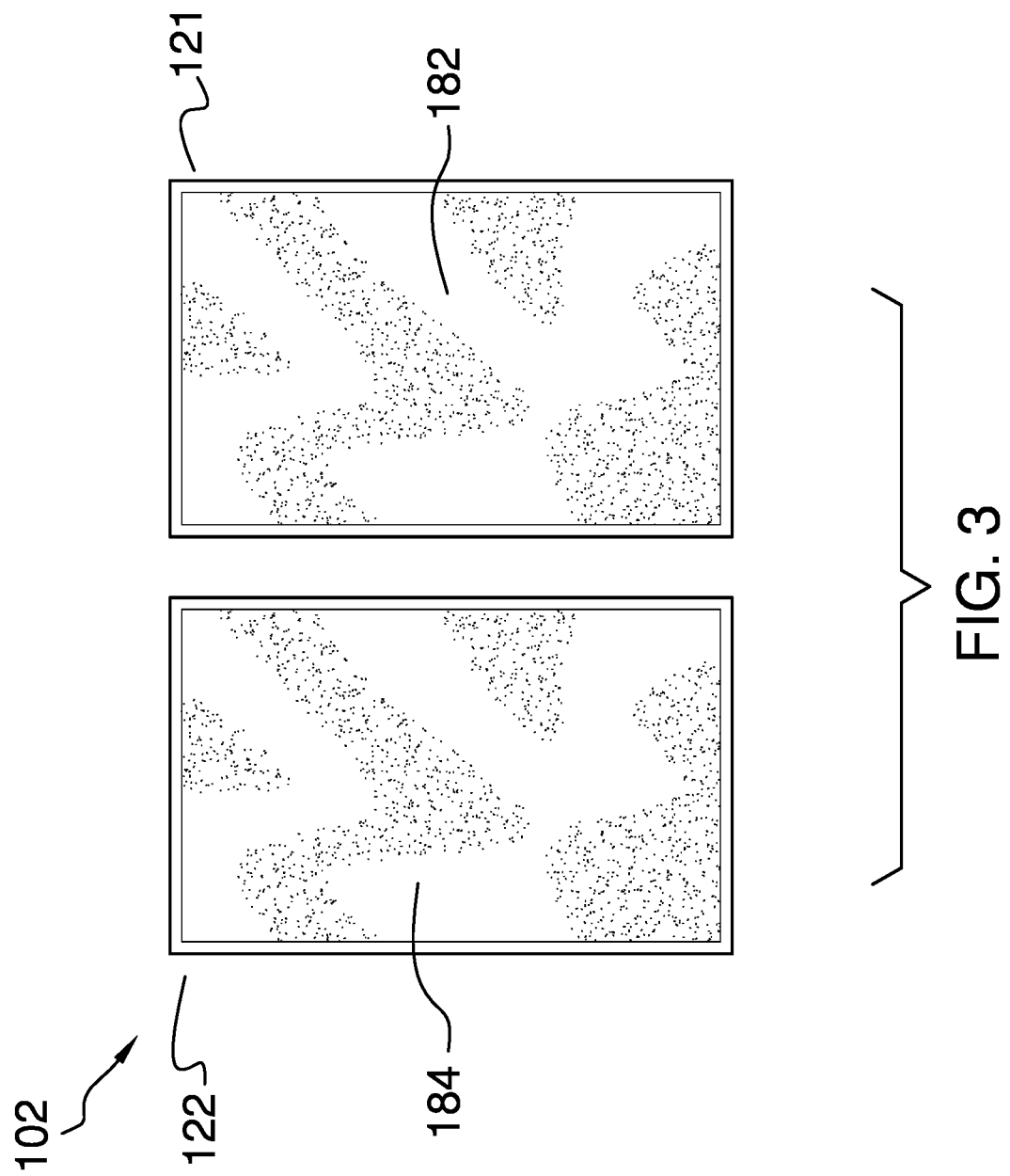
FIG. 3 is a reverse detail view of an embodiment of the disclosure.
Figure 4:
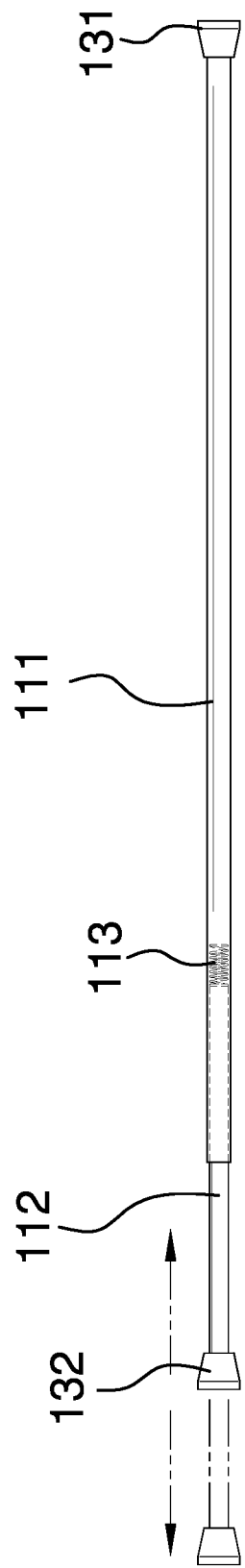
FIG. 4 is a detail view of an embodiment of the disclosure.
Figure 5:
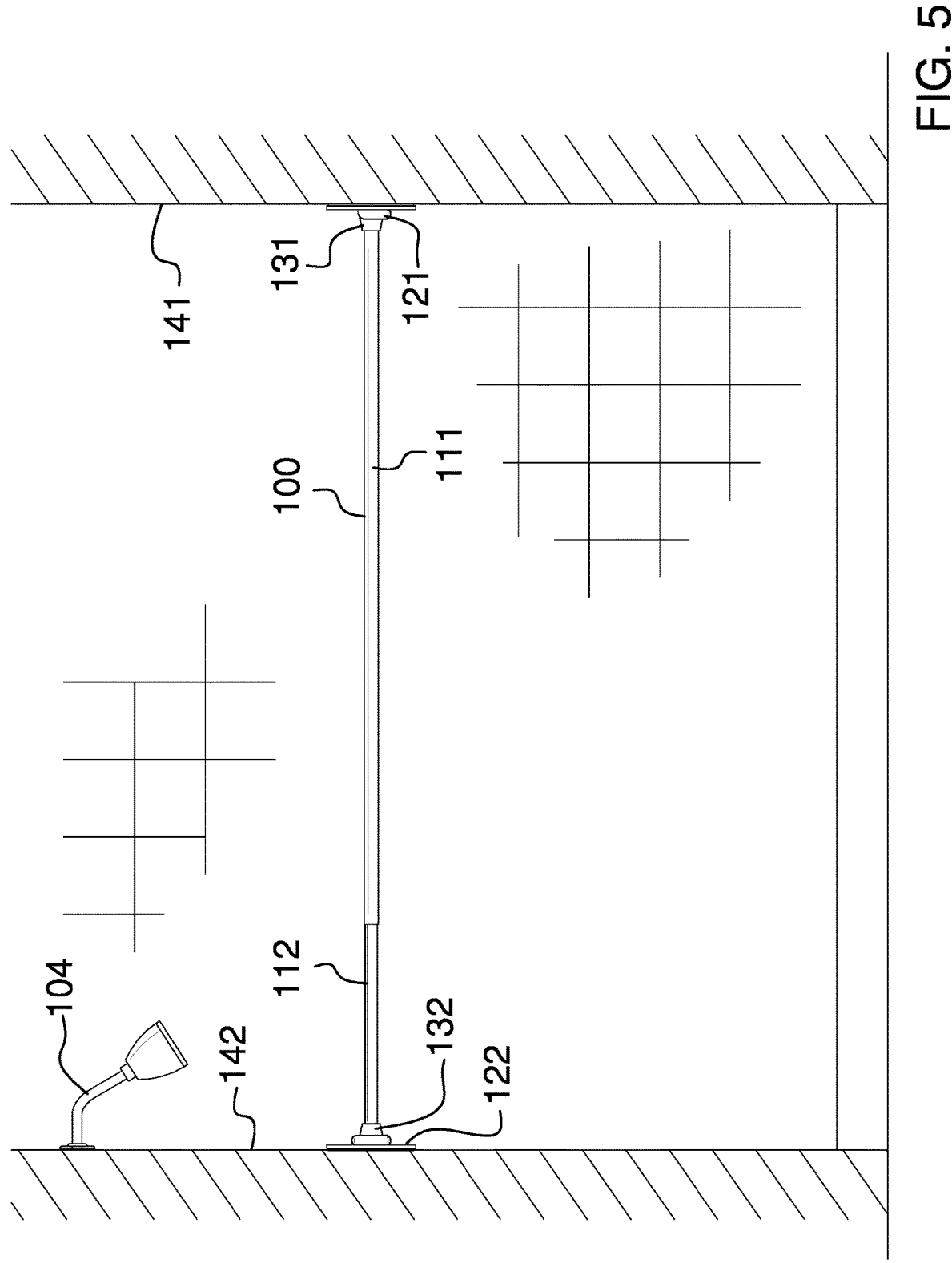
FIG. 5 is an in-use view of an embodiment of the disclosure.

Detailed reference will now be made to one or more potential embodiments of the disclosure, which are illustrated in FIGS. 1 through 5.

The compression-mounted shower grab bar 100 (hereinafter invention) comprises a grab bar 101, a plurality of mounting plates 102, a plurality of mounting caps 103, and a shower 104. The shower 104 further comprises a first wall 141 and a second wall 142. The invention 100 is adapted for use by a client 105. The invention 100 forms a structure the client 105 can grasp for improved stability. The invention 100 removably mounts between the first wall 141 and the second wall 142 of the shower 104. The plurality of mounting caps 103 secures the grab bar 101 to the plurality of mounting plates 102. The grab bar 101 applies a compressive force that presses the plurality of mounting plates 102 against the first wall 141 and the second wall 142 such that the grab bar 101 is: a) secured to a fixed position in the shower 104; and, b) transfers the load of the client 105 to the first wall 141 and the second wall 142.

The shower 104 is defined elsewhere in this disclosure. The client 105 is defined elsewhere in this disclosure. The first wall 141 is a first interior wall of the structure that forms the interior boundaries of the shower 104. The second wall 142 is a second interior wall of the structure that forms the interior boundaries of the shower 104. The face of the second wall 142 is parallel to the face of the first wall 141.

The grab bar 101 is a prism-shaped structure. The grab bar 101 is a composite prism structure. The grab bar 101 forms the structure that is grasped by the client 105. The grab bar 101 transfers the load of the client 105 to the first wall 141 and the second wall 142 of the shower 104. The grab bar 101 is positioned in the shower 104 such that the center axis of the composite prism structure of the grab bar 101 has a horizontal orientation.

The grab bar 101 is a telescopic structure. By telescopic structure is meant that the span of the length of the composite prism structure of the grab bar 101 is adjustable.

The grab bar 101 is a spring-loaded structure. In the relaxed shaped, the span of the length of the center axis of the composite prism structure of the grab bar 101 is at its maximum. The spring-loaded structure of the grab bar 101 is deformed as the span of the length of the center axis of the composite prism structure of the grab bar 101 is compressed. The grab bar 101 is compressed such that the center axis of the composite prism structure of the grab bar 101 fits between the first wall 141 and the second wall 142 of the shower 104. As the deformation force applied to the grab bar 101 is removed, the grab bar 101 returns towards its relaxed shape such that the grab bar 101 applies a force that presses the plurality of mounting plates 102 and the plurality of mounting caps 103 against the first wall 141 and the second wall 142 of the shower 104. The force applied by the grab bar 101 to the first wall 141 and the second wall 142 secures the grab bar 101 to the shower 104.

The grab bar 101 comprises a first arm 111, a second arm 112, and a spring 113.

The spring 113 is a detent structure that secures the second arm 112 to the first arm 111. The spring 113 is a mechanical structure that deforms as the span of the length of the composite prism structure changes. As the deformation force applied to the spring 113 is removed the spring 113 returns to its relaxed shape. The spring 113 generates the forces that press the plurality of mounting plates 102 into the first wall 141 and the second wall 142 of the shower 104.

The first arm 111 is a prism-shaped structure. The first arm 111 has a tubular structure. The first arm 111 is further defined with an inner dimension. The second arm 112 is a prism-shaped structure. The second arm 112 is geometrically similar to the first arm 111. The second arm 112 is further defined with an inner dimension. The span of the length of the outer dimension of the second arm 112 is lesser than the span of the length of the inner dimension of the first arm 111 such that the second arm 112 inserts into the first arm 111 in a telescopic manner. The span of the length of the composite prism structure of the grab bar 101 adjusts by adjusting the position of the second arm 112 within the first arm 111.

The first arm 111 comprises a first free end 151. The first free end 151 is a congruent end of the prism structure of the first arm 111. The first free end 151 is the congruent end of the first arm 111 that is distal from the congruent end of first arm 111 that receives the second arm 112. The second arm 112 comprises a second free end 152. The second free end 152 is a congruent end of the prism structure of the second arm 112. The second free end 152 is the congruent end of the second arm 112 that is distal from the congruent end of second arm 112 that inserts into the first arm 111.

Each of the plurality of mounting caps 103 is a prism-shaped structure. Each of the plurality of mounting caps 103 is geometrically similar to a free end selected from the group consisting of the first free end 151 of the first arm 111 and the second free end 152 of the second arm 112. Each of the plurality of mounting caps 103 is formed from a non-skid material. Each of the plurality of mounting caps 103 attaches its selected free end to the associated mounting plate selected from the plurality of mounting plates 102 such that the arm associated with the selected free end will not slip while in the selected mounting plate. The plurality of mounting caps 103 comprises a first mounting cap 131 and a second mounting cap 132.

The first mounting cap 131 is the mounting cap selected from the plurality of mounting caps 103 that attaches to the first free end 151 of the first arm 111. The first mounting cap 131 has a pan structure. The first mounting cap 131 is sized such that the first free end 151 of the first arm 111 inserts to form a tight fit with the first mounting cap 131. The term tight fit is defined elsewhere in this disclosure. The first mounting cap 131 forms a non-skid structure that secures the first arm 111 to the first flange 171 of the first mounting plate 121.

The second mounting cap 132 is the mounting cap selected from the plurality of mounting caps 103 that attaches to the second free end 152 of the second arm 112. The second mounting cap 132 has a pan structure. The second mounting cap 132 is sized such that the second free end 152 of the second arm 112 inserts to form a tight fit with the second mounting cap 132. The term tight fit is defined elsewhere in this disclosure. The second mounting cap 132 forms a non-skid structure that secures the second arm 112 to the second flange 172 of the second mounting plate 122.

Each of the plurality of mounting plates 102 is a mechanical structure. Each of the plurality of mounting plates 102 transfers the compression forces generated by the grab bar 101 to a wall selected from the group consisting of the first wall 141 and the second wall 142. Each of the plurality of mounting plates 102 forms a pedestal structure that further transfers the load of the client 105 to the selected wall. The plurality of mounting plates 102 comprises a first mounting plate 121 and a second mounting plate 122.

The first mounting plate 121 is the mounting plate selected from the plurality of mounting plates 102 that secures the first arm 111 to the first wall 141. The first mounting plate 121 comprises a first disk structure 161 and a first flange 171.

The first disk structure 161 is a prism-shaped structure. The first disk structure 161 has a disk shape. The first disk structure 161 forms the structure that physically contacts the first wall 141 as the grab bar 101 presses into the first wall 141. The surface area of the first disk structure 161 is greater than the surface area of the first free end 151 of the first arm 111 such that the pressure applied by the grab bar 101 against the first wall 141 is diffused over the greater surface area of the first disk structure 161. The first disk structure 161 comprises a first congruent end 181 and a second congruent end 182.

The second congruent end 182 is the congruent end of the first disk structure 161 with the greatest surface area. The second congruent end 182 is the congruent end of the first disk structure 161 that presses against the first wall 141. The second congruent end 182 is coated with a non-skid material such that the first mounting plate 121 will resist sliding along the first wall 141. The first congruent end 181 is the congruent end of the first disk structure 161 with the second greatest surface area. The first congruent end 181 is the congruent end of the first disk structure 161 that is distal from the second congruent end 182. The first flange 171 mounts on the first congruent end 181.

The first flange 171 is a flange that is formed on the first congruent end 181 of the disk structure of the first disk structure 161. The flange is defined elsewhere in this disclosure. The first flange 171 secures the first free end 151 of the first arm 111 and the first mounting cap 131 that covers the first free end 151 to the first disk structure 161.

The second mounting plate 122 is the mounting plate selected from the plurality of mounting plates 102 that secures the second arm 112 to the second wall 142. The second mounting plate 122 comprises a second disk structure 162 and a second flange 172.

The second disk structure 162 is a prism-shaped structure. The second disk structure 162 has a disk shape. The second disk structure 162 forms the structure that physically contacts the second wall 142 as the grab bar 101 presses into the second wall 142. The surface area of the second disk structure 162 is greater than the surface area of the second free end 152 of the second arm 112 such that the pressure applied by the grab bar 101 against the second wall 142 is diffused over the greater surface area of the second disk structure 162. The second disk structure 162 comprises a third congruent end 183 and a fourth congruent end 184.

The fourth congruent end 184 is the congruent end of the second disk structure 162 with the greatest surface area. The fourth congruent end 184 is the congruent end of the second disk structure 162 that presses against the second wall 142. The fourth congruent end 184 is coated with a non-skid material such that the second mounting plate 122 will resist sliding along the second wall 142. The third congruent end 183 is the congruent end of the second disk structure 162 with the second greatest surface area. The third congruent end 183 is the congruent end of the second disk structure 162 that is distal from the fourth congruent end 184. The second flange 172 mounts on the third congruent end 183.

The second flange 172 is a flange that is formed on the third congruent end 183 of the disk structure of the second disk structure 162. The flange is defined elsewhere in this disclosure. The second flange 172 secures the second free end 152 of the second arm 112 and the second mounting cap 132 that covers the second free end 152 to the second disk structure 162.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cap: As used in this disclosure, a cap is a protective structure that encloses the end of a shaft.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Client: As used in this disclosure, a client is an individual who is designated to receive the services of the disclosure at bar.

Collar: As used in this disclosure, a collar is a ring like device that secures an object in a position.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar Compress: In this disclosure, compress means to apply a forces to force a fixed mass of material into a smaller space.

Compression Spring: As used in this disclosure, a compression spring is a spring that resists forces attempting to compress the spring in the direction of the center axis of the spring. The compression spring will return to its relaxed shape when the compressive force is removed.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Fixed End: As used in this disclosure, a fixed end refers to the end of a shaft, pipe, or tube that is secured to an object.

Flange: As used in this disclosure, a flange is a protruding rib, edge, or collar that is used to hold an object in place or to attach a first object to a second object.

Force: As used in this disclosure, a force refers to a net (or unopposed) measurable interaction that changes the direction of motion of an object, the velocity of motion of an object, the momentum of an object, or the stress within an object.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Free End: As used in this disclosure, a free end refers to the end of a disk, shaft, pipe, or tube that is not secured to an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Non-Skid Material: As used in this disclosure, a non-skid material is a material or structure that can be applied to an object such that the object is inhibited from sliding along the surface upon which the object is resting. Non-skid materials are often, but not always, adhesive, elastic, or abrasive materials.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Pressure: As used in this disclosure, pressure refers to a measure of force per unit area.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Private: As used in this disclosure, the term private refers to the limitation of use of an object to a one or more individual. The term privacy refers to maintaining an object or individual in a location where the object or individual can be neither observed nor disturbed.

Relaxed Shape: As used in this disclosure, a structure is considered to be in its relaxed state when no shear, strain, or torsional forces are being applied to the structure.

Shower: As used in this disclosure, a shower is a mechanical structure that generates a spray of water used by a client for cleaning. The shower is typically maintained in an enclosed space that provides privacy. A community shower refers to one or more showers that do not provide for the privacy of the client.

Spray: As used in this disclosure, a spray is a plurality of liquid drops dispersed in a gas.

Spray Nozzle: As used in this disclosure, a spray nozzle is a device that receives liquid under pressure and disperses that liquid into the atmosphere as a spray.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Tight Fit: As used in this disclosure, a tight fit refers to the insertion of a first object into a second object such that there is not a lot of space between the first object and the second object. By not a lot of space is meant that friction occurs when the first object moves within the second object.

Tube: As used in this disclosure, the term tube is used to describe a rigid hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wall: As used in this disclosure, a wall is a vertical surface that forms a boundary of a room or chamber.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A compression mounted structure comprising
a grab bar, a plurality of mounting plates, a plurality of mounting caps, and a shower;
wherein the plurality of mounting caps secures the grab bar to the plurality of mounting plates;
wherein the plurality of mounting plates secures the grab bar to the shower;
wherein the plurality of mounting caps comprises a first mounting cap and a second mounting cap;
wherein the first mounting cap is the mounting cap selected from the plurality of mounting caps that attaches to a first arm;
wherein the second mounting cap is the mounting cap selected from the plurality of mounting caps that attaches to a second arm;
wherein the plurality of mounting plates comprises a first mounting plate and a second mounting plate;
wherein the first mounting plate is the mounting plate selected from the plurality of mounting plates that secures the first arm to a first wall;
wherein the second mounting plate is the mounting plate selected from the plurality of mounting plates that secures the second arm to a second wall;
wherein the first mounting cap is the mounting cap selected from the plurality of mounting caps that attaches to a first free end of the first arm;
wherein the first mounting plate comprises a first disk structure and a first flange;
wherein the second mounting plate comprises a second disk structure and a second flange;
wherein the first mounting cap has a pan structure;
wherein the first mounting cap is sized such that the first free end of the first arm inserts to form a tight fit with the first mounting cap;
wherein the first mounting cap forms a non-skid structure that secures the first arm to the first flange of the first mounting plate;
wherein the second mounting cap is the mounting cap selected from the plurality of mounting caps that attaches to the second free end of the second arm;
wherein the second mounting cap has a pan structure;
wherein the second mounting cap is sized such that the second free end of the second arm inserts to form a tight fit with the second mounting cap;
wherein the second mounting cap forms a non-skid structure that secures the second arm to the second flange of the second mounting plate;

wherein the first disk structure has a disk shape;
wherein the first disk structure forms the structure that physically contacts the first wall as the grab bar presses into the first wall;
wherein the surface area of the first disk structure is greater than the surface area of the first free end of the first arm such that the pressure applied by the grab bar against the first wall is diffused over the greater surface area of the first disk structure;
wherein the first disk structure comprises a first congruent end and a second congruent end;
wherein the second congruent end is the congruent end of the first disk structure with the greatest surface area;
wherein the second congruent end is the congruent end of the first disk structure that presses against the first wall;
wherein the second congruent end is coated with a non-skid material such that the first mounting plate will resist sliding along the first wall;
wherein the first congruent end is the congruent end of the first disk structure with the second greatest surface area;
wherein the first congruent end is the congruent end of the first disk structure that is distal from the second congruent end;
wherein the first flange is a flange that is formed on the first congruent end of the disk structure of the first disk structure;
wherein the first flange secures the first free end of the first arm and the first mounting cap that covers the first free end to the first disk structure;
wherein the second disk structure has a disk shape;
wherein the second disk structure forms the structure that physically contacts the second wall as the grab bar presses into the second wall;
wherein the surface area of the second disk structure is greater than the surface area of the second free end of the second arm such that the pressure applied by the grab bar against the second wall is diffused over the greater surface area of the second disk structure;
wherein the second disk structure comprises a third congruent end and a fourth congruent end;
wherein the fourth congruent end is the congruent end of the second disk structure with the greatest surface area;
wherein the fourth congruent end is the congruent end of the second disk structure that presses against the second wall;
wherein the fourth congruent end is coated with a non-skid material such that the second mounting plate will resist sliding along the second wall;
wherein the third congruent end is the congruent end of the second disk structure with the second greatest surface area;
wherein the third congruent end is the congruent end of the second disk structure that is distal from the fourth congruent end;
wherein the second flange is a flange that is formed on the third congruent end of the disk structure of the second disk structure;
wherein the second flange secures the second free end of the second arm and the second mounting cap that covers the second free end to the second disk structure.

2. The compression mounted structure according to claim 1
wherein the shower further comprises a first wall and a second wall;
wherein the first wall is a first interior wall of the structure that forms the interior boundaries of the shower;
wherein the second wall is a second interior wall of the structure that forms the interior boundaries of the shower;
wherein the face of the second wall is parallel to the face of the first wall;
wherein the grab bar applies a compressive force that presses the plurality of mounting plates against the first wall and the second wall such that the grab bar is: a) secured to a fixed position in the shower; and, b) transfers a load of the client to the first wall and the second wall.

3. The compression mounted structure according to claim 2
wherein the compression mounted structure is adapted for use by a client;
wherein the compression mounted structure forms a structure the client can grasp;
wherein the compression mounted structure removably mounts between the first wall and the second wall of the shower.

4. The compression mounted structure according to claim 3
wherein the grab bar is a composite structure;
wherein the grab bar forms the structure that is grasped by the client;
wherein the grab bar transfers the load of the client to the first wall and the second wall of the shower;
wherein the grab bar is positioned in the shower such that the center axis of the composite structure of the grab bar has a horizontal orientation.

5. The compression mounted structure according to claim 4
wherein the grab bar is a telescopic structure;
wherein by telescopic structure is meant that the span of the length of the composite structure of the grab bar is adjustable.

6. The compression mounted structure according to claim 5
wherein the grab bar is a spring-loaded structure;
wherein in the relaxed shaped, the span of the length of the center axis of the composite structure of the grab bar is at its maximum;
wherein the spring-loaded structure of the grab bar is deformed as the span of the length of the center axis of the composite structure of the grab bar is compressed;
wherein the grab bar is compressed such that the center axis of the composite structure of the grab bar fits between the first wall and the second wall of the shower;
wherein as the deformation force applied to the grab bar is removed, the grab bar returns towards its relaxed shape such that the grab bar applies a force that presses the plurality of mounting plates and the plurality of mounting caps against the first wall and the second wall of the shower;
wherein the force applied by the grab bar to the first wall and the second wall secures the grab bar to the shower.

7. The compression mounted structure according to claim 6
wherein each of the plurality of mounting caps is geometrically similar to a free end selected from the group consisting of the first free end of the first arm and the second free end of the second arm;
wherein each of the plurality of mounting caps is formed from a non-skid material;
wherein each of the plurality of mounting caps attaches its selected free end to the associated mounting plate selected from the plurality of mounting plates such that the arm associated with the selected free end will not slip while in the selected mounting plate.

8. The compression mounted structure according to claim 7
wherein each of the plurality of mounting plates is a mechanical structure;
wherein each of the plurality of mounting plates transfers the compression forces generated by the grab bar to a wall selected from the group consisting of the first wall and the second wall;
wherein each of the plurality of mounting plates forms a pedestal structure that further transfers the load of the client to the selected wall.

9. The compression mounted structure according to claim 8
wherein the grab bar comprises a first arm, a second arm, and a spring;
wherein the spring is a detent that secures the second arm to the first arm.

10. The compression mounted structure according to claim 9
wherein the spring is a mechanical structure that deforms as the span of the length of the composite structure changes;
wherein as the deformation force applied to the spring is removed, the spring returns to its relaxed shape;
wherein the spring generates the forces that press the plurality of mounting plates into the first wall and the second wall of the shower.

11. The compression mounted structure according to claim 10
wherein the first arm has a tubular structure;
wherein the first arm is further defined with an inner dimension;
wherein the second arm is geometrically similar to the first arm;
wherein the second arm is further defined with an inner dimension;
wherein the span of the length of the outer dimension of the second arm is lesser than the span of the length of the inner dimension of the first arm such that the second arm inserts into the first arm in a telescopic manner;
wherein the span of the length of the composite structure of the grab bar adjusts by adjusting the position of the second arm within the first arm;
wherein the first arm comprises a first free end;
wherein the first free end is a congruent end of the first arm;
wherein the first free end is the congruent end of the first arm that is distal from the congruent end of first arm that receives the second arm;
wherein the second arm comprises a second free end;
wherein the second free end is a congruent end of the second arm;
wherein the second free end is the congruent end of the second arm that is distal from the congruent end of second arm that inserts into the first arm.

\* \* \* \* \*